Patented July 2, 1940

2,206,510

UNITED STATES PATENT OFFICE 2,206,510

HALOGENATING NITROAMINOBENZENE SULPHONIC ACID

Georg Matthaeus, Wolfen, Kreis Bitterfeld, Germany, assignor to General Aniline & Film Corporation, a corporation of Delaware No Drawing. Application September 13, 1938, Serial No. 229,705. In Germany November 20, 1937

8 Claims. (Cl. 260—508)

The present invention relates to a process for manufacturing 2-chloro(or bromo)-4(or 6)-nitro-1-amino benzene-6(or 4)-sulphonic acid.

By the action of iodine monochloride on an aqueous solution of 4-nitro-1-aminobenzene-6-sulphonic acid there is generally produced a mixture of about equal parts of 2,6-diiodo-4-nitro-1-aminobenzene and 2-iodo-4-nitro-1-aminobenzene-6-sulphonic acid. Even under the most favorable conditions of working the yield of 2-iodo-4-nitraniline-6-sulphonic acid can be raised at most only to about 70 per cent. Concerning the reaction between free halogen and 4-nitraniline-6-sulphonic acid there is nothing to be found in the literature. It is to be supposed that in this case the disinclination of the labile sulpho group to exchange with halogen would prevail, so that there would be formed an undesired mixture of 2,6-dihalogen-nitraniline and 2-halogen-4-nitro-1-aminobenzene-6-sulphonic acid. It has been found, however, that the bromination and chlorination of 4-nitro-1-aminobenzene-6-sulphonic acid or 6-nitro-1-aminobenzene-4-sulphonic acid under salts, for instance, alkali salts or ammonium salts, react with free halogen to produce chiefly the 2-halogen-4(or 6)-nitro-1-aminobenzene-6(or 4)-sulphonic acid, if the reaction is conducted in water, or in a suitable organic solvent, for instance, carbon tetrachloride or chloroform. An especially suitable solvent for the purpose is an aqueous saline solution, for instance, a solution of common salt, calcium chloride or the like, for in this case a nearly quantitative yield may be obtained.

The 2-chloro(or bromo)-4(or 6)-nitro-1-aminobenzene-6(or 4)-sulphonic acid is a valuable intermediate product for azo dyes.

The following examples illustrate the invention, the parts being by weight, and the parts by volume have the same relation to the parts by weight as the liter has to the kilo:

*Example 1.*—117.5 parts of ammonium paranitraniline-sulphonate are dissolved in 1500 parts of water. At ordinary or reduced temperature a mixture of 80 parts of bromine and about 100 parts of glacial acetic acid is allowed to drop into the solution while vigorously stirring. When the reaction is complete, the sulphonic acid, insofar as it has not already precipitated, is salted out and recrystallized from water to remove accompanying 3,6-dibromo-4-nitraniline. The yield is about 80 to 90 per cent. of the theoretical.

Instead of conducting the operation in water, a chloroform solution may be used, advantageously with the addition of a small proportion of water (about 5 to 10 per cent).

*Example 2.*—117.5 parts of ammonium paranitraniline-sulphonate are dissolved in 1500 parts of hot water; 450 parts of common salt are added, which dissolve easily, whereby the sodium salt of the sulphonic acid is precipitated in a finely suspended condition. After cooling to 0 to 5° C. a mixture of 80 parts of bromine and 100 parts of glacial acetic acid is allowed to drop slowly into the suspension while vigorously stirring. When the reaction is complete, sodium-2-bromo-4-nitro-1-aminobenzene-6-sulphonate is filtered, washed neutral with common salt solution and, if desired, recrystallized from water. The yield is nearly quantitative. The salt forms yellow crystals soluble in water and still not melting at 360° C. The diazo compound is sparingly soluble in water.

In corresponding manner 2-chloro-4-nitraniline-6-sulphonic acid may be obtained.

*Example 3.*—240 parts of sodium-2-nitro-1-aminobenzene-4-sulphonate are dissolved in 3000 parts of water, and the solution is mixed with 900 parts of common salt. The reaction temperature is 0 to 5° C. While stirring well, a mixture of 53 parts by volume of bromine and 200 parts by volume of glacial acetic acid is allowed to drop slowly into the mixture. The sodium-2-bromo-6-nitro-1-aminobenzene-4-sulphonate is thus obtained in nearly quantitative yield.

It is obvious that my invention is not limited to the foregoing examples or to the specific details given therein. Other water-soluble salts of the acids in question may be subjected to the halogenation and the temperatures maintained during this process, may be varied. Preferably, however, the reacting solution is cooled, in order to avoid the formation of undesired by-products. Instead of sodium chloride or calcium chloride another water-soluble salt, such as, for instance, sodium-, potassium-, ammonium-sulphate may be added.

What I claim is:

1. The process which comprises acting with a halogen of the group consisting of chlorine and bromine upon a nitroaminobenzene sulphonic acid of the group consisting of 4-nitro-1-aminobenzene-6-sulphonic acid and 6-nitro-1-aminobenzene-4-sulphonic acid.

2. The process which comprises acting with a halogen of the group consisting of chlorine and bromine upon a water-soluble salt of a nitroaminobenzene sulphonic acid of the group consisting of 4-nitro-1-aminobenzene-6-sulphonic acid and 6-nitro-1-aminobenzene-4-sulphonic acid in the presence of water.

3. The process which comprises acting with a halogen of the group consisting of chlorine and bromine upon a water-soluble salt of a nitro-aminobenzene sulphonic acid of the group consisting of 4-nitro-1-aminobenzene-6-sulphonic acid and 6-nitro-1-aminobenzene-4-sulphonic acid in the presence of water, while cooling to a temperature below room-temperature.

4. The process which comprises acting with a halogen of the group consisting of chlorine and bromine upon a water-soluble salt of a nitro-aminobenzene sulphonic acid of the group consisting of 4-nitro-1-aminobenzene-6-sulphonic acid and 6-nitro-1-aminobenzene-4-sulphonic acid in the presence of water and of a member of the group consisting of a water-soluble alkali and an alkaline earth metal salt.

5. The process which comprises acting with a halogen of the group consisting of chlorine and bromine upon a water-soluble salt of a nitro-aminobenzene sulphonic acid of the group consisting of 4-nitro-1-aminobenzene-6-sulphonic acid and 6-nitro-1-aminobenzene-4-sulphonic acid in the presence of water and of sodium chloride.

6. The compounds which correspond to the general formula

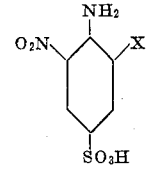

wherein X means a halogen of the group consisting of chlorine and bromine.

7. 1-amino-1-chloro-6-nitrobenzene-4-sulphonic acid.

8. 1-amino-2-bromo-6-nitrobenzene-4-sulphonic acid.

GEORG MATTHAEUS.